(12) United States Patent
Vantomme et al.

(10) Patent No.: US 9,221,930 B2
(45) Date of Patent: Dec. 29, 2015

(54) POLYETHYLENE WITH LOW CATALYTIC RESIDUES

(75) Inventors: Aurélien Vantomme, Bois-de-Villers (BE); Christopher Willocq, Bousval (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 0 days.

(21) Appl. No.: 14/343,572

(22) PCT Filed: Sep. 6, 2012

(86) PCT No.: PCT/EP2012/067372
§ 371 (c)(1),
(2), (4) Date: Jun. 19, 2014

(87) PCT Pub. No.: WO2013/034623
PCT Pub. Date: Mar. 14, 2013

(65) Prior Publication Data
US 2014/0303340 A1    Oct. 9, 2014

(30) Foreign Application Priority Data

Sep. 9, 2011  (EP) ..................... 11180770
Oct. 5, 2011  (EP) ..................... 11184036

(51) Int. Cl.
| | | |
|---|---|---|
| C08F 110/02 | (2006.01) | |
| C08F 10/02 | (2006.01) | |
| C08F 4/659 | (2006.01) | |
| C08F 4/6592 | (2006.01) | |

(52) U.S. Cl.
CPC .......... *C08F 110/02* (2013.01); *C08F 4/65912* (2013.01); *C08F 4/65927* (2013.01); *C08F 10/02* (2013.01)

(58) Field of Classification Search
CPC ...... C08F 10/02; C08F 110/02; C08F 210/02; C08F 2500/07; C08F 6/02; C08F 6/08; C08F 2/42
USPC ......................................................... 526/352
See application file for complete search history.

(56) References Cited

U.S. PATENT DOCUMENTS

| | | | | | |
|---|---|---|---|---|---|
| 4,454,281 | A | * | 6/1984 | Heitz ....................... | C08K 3/36 523/100 |
| 4,594,213 | A | * | 6/1986 | Ealer ........................ | C08J 5/18 264/210.6 |
| 4,798,081 | A | | 1/1989 | Hazlitt et al. | |
| 6,586,537 | B2 | * | 7/2003 | Marissal et al. ............... | 526/70 |
| 6,596,823 | B2 | * | 7/2003 | Marissal ................ | B01J 8/0055 422/132 |
| 7,148,304 | B2 | * | 12/2006 | Kimberley ........... | C07D 213/53 526/161 |
| 8,436,114 | B2 | * | 5/2013 | Crowther .............. | C08F 210/16 502/114 |
| 2011/0009576 | A1 | * | 1/2011 | Chamayou ............ | C08F 210/16 526/89 |
| 2013/0144016 | A1 | * | 6/2013 | Willocq .............. | C08F 4/63922 526/64 |
| 2013/0211018 | A1 | * | 8/2013 | Willocq ................ | C08F 210/00 526/64 |
| 2013/0225772 | A1 | * | 8/2013 | Willocq et al. ................. | 526/64 |

FOREIGN PATENT DOCUMENTS

| | | | | |
|---|---|---|---|---|
| EP | 0882743 A1 | 12/1998 | | |
| JP | 10-182764 A | * 7/1998 | ............ | C08F 297/08 |
| JP | 2009108177 A | 5/2009 | | |
| WO | 2011107560 A1 | 9/2011 | | |
| WO | 2012001160 A2 | 1/2012 | | |
| WO | WO 2012/001160 A2 | * 1/2012 | ............... | C08F 4/02 |
| WO | 2012020145 A1 | 2/2012 | | |
| WO | WO 2012/020145 A1 | * 2/2012 | ............... | C08F 4/02 |

OTHER PUBLICATIONS

Database WPI Week 200935, Thomson Scientific, London, GB; AN 2009-J40325, XP002678080.
Jongsomjit, et al., "Catalytic Activity During Copolymerization of Ethylene and 1-Hexene via Mixed TiO2/SiO2-Supported MAO with rac-Et[Ind]2ZrCl2 Metallocene Catalyst", Molecules, 2005, vol. 10, pp. 672-678.
Jongsomjit, et al., "Application of Silica/Titania Mixed Oxide-Supported Zirconocene Catalyst for Synthesis of Linear Low-Density Polyethylene", Ind. Eng. Chem. Res. 2005, vol. 44, No. 24, pp. 9059-9063.
Jongsomjit, et al., "Role of titania in TiO2-SiO2 mixed oxides-supported metallocene catalyst during ethylene/1-octene copolymerization", Catalysis Letters, vol. 100, No. 3-4, Apr. 2005, pp. 139-146.
Conway, et al., "Chromia/Silica-Titania Cogel Catalysts for Ethene Polymerisation", Journal of the Chemical Society, Faraday Transactions 1, 1989, 85(1), pp. 71-78.
Wild, et al, "Determination of Branching Distributions in Polyethylene and Ethylene Copolymers", Journal of Polymer Science, Polymer Physics Edition, 1982, vol. 20, pp. 441-455.
International Search Report issued in PCT/EP2012/067372 mailed on May 23, 2013, 3 pages.

* cited by examiner

*Primary Examiner* — Rip A Lee

(57) ABSTRACT

A polyethylene can be prepared with a metallocene catalyst system. The polyethylene can have a density of at least 0.945 g/cm³ measured according to ISO 1183, and a Si content of 5 to 40 ppm by weight.

12 Claims, No Drawings

POLYETHYLENE WITH LOW CATALYTIC RESIDUES

CROSS REFERENCE TO RELATED APPLICATIONS

This application claims the benefit of PCT/EP2012/067372, filed on Sep. 6, 2012, which claims priority from European Application No. 11180770.7, filed on Sep. 9, 2011, and European Application No. 11184036.9, filed on Oct. 5, 2011.

FIELD OF THE INVENTION

The invention relates to polyethylene prepared with a metallocene catalyst having low catalytic residues.

BACKGROUND OF THE INVENTION

Metallocene catalyst systems are extensively used in a variety of olefin polymerisation systems, including the polymerisation of ethylene. Metallocene catalysts prepare polyethylene different from Ziegler-Natta and Phillips chromium-based catalysts in that they are generally single-site catalysts, thus suitable for polyethylene having a narrow molecular weight distribution, but also a uniform comonomer incorporation, not only on short polymer chains, but equally so on long polymer chains (a narrow comonomer distribution, preferably a comonomer distribution breadth index of greater than 50%). Generally, in order to obtain the highest activity from metallocene catalysts, it has been necessary to use them with an organoaluminoxane activating agent, such as methylaluminoxane (MAO). This resulting catalyst system is generally referred to as a homogenous catalyst system since at least part of the metallocene or the organoaluminoxane is in solution in the polymerisation media. These homogenous catalyst systems have the disadvantage that when they are used under slurry polymerisation conditions, they produce polyethylene, which stick to the reactor walls during the polymerisation process (generally referred to as "fouling") and/or polyethylene having small particle size and low bulk density which limit their commercial utility.

Various methods have been proposed in an effort to overcome the disadvantages of the homogenous metallocene catalyst systems. Typically, these procedures have involved the prepolymerisation of the metallocene aluminoxane catalyst system and/or supporting the catalyst system components on a porous carrier (also known as a "particulate solid" or "support"). The porous carrier is usually a silica-containing support. However, although such supports reduce fouling, they also decrease the catalytic activity i.e. the yield of solid polymer that is obtained by employing a given quantity of catalyst in a given amount of time.

There is an ongoing search for metallocene catalysts and techniques for preparing such catalysts which give improved activity for the polymerisation of olefins. An improved activity means that less metallocene catalyst needs to be used to polymerise more ethylene, thereby reducing the costs considerably, since metallocenes are more expensive than Ziegler-Natta and chromium catalysts. As a result, the polyethylene would have a reduced catalytic residue, which also means less volatiles and better organoleptic properties. In particular, it has been proven more difficult to improve the activity of metallocene catalysts in the preparation of high density polyethylene i.e. above 0.945 g/cc. This is because for high density polyethylene, less comonomer is used. The activity of lower density polyethylene, below 0.945 g/cc, is generally higher since the presence of comonomer increases yield and activity.

Several attempts have been made to titanate silica supports for use in metallocene catalysed ethylene polymerisations. Jongsomjit et al. (Molecules 2005, 10, 672, Ind. Eng. Chem. Res. 2005, 44, 9059 and Catalysis Letters Vol. 100, Nos. 3-4, April 2005) discloses the titanation of silicas for zirconocene catalysed ethylene polymerisation, wherein the support is allegedly prepared according to Conway et al. (J. Chem. Soc., Faraday Trans. J, 1989, 85(1), 71-78), such that (without being bound to theory) the titania is mixed throughout the catalyst support. Without being bound to theory it is thought that the activity is limited, because the catalyst grains are not rendered fragile enough to burst during polymerisation and free up active sites. In addition, the interaction of the Ti with the actives sites is not optimized. Moreover, the interaction of the MAO with the TiOH and/or SiOH is different.

EP 0882 743 discloses a titanation procedure wherein the titanium compound is pumped as a liquid into the reaction zone where it vaporises to titanate a supported chromium-based catalyst. This procedure is strictly applicable to chromium catalysts (Philipp's type catalysts) i.e. only supported chromium catalysts are titanated in this way in order to obtain shorter polymer chains during polymerisation of olefins. There is no incentive to titanate a support (which does not contain any chromium) in the same way for use in metallocene catalysed olefin polymerisations with the hope of increasing the catalyst system's activity. Chromium catalysts are an entirely different class of catalyst from metallocenes, the latter being single-site and much more sensitive to poisons. They undergo such completely different reaction mechanisms that polyolefins prepared with chromium catalysts and metallocene catalysts have very different molecular structures, notably metallocenes provide polyolefins with narrower molecular weight distributions. In addition, chromium catalysts after being titanated require severe activation conditions, e.g. activation temperatures of at least 700° C., so that the titanium compounds ignite to yield at least partially $TiO_2$. In any case, this system is limited to polyethylene prepared with a chromium-based (Phillips-type) catalyst and is not applicable to metallocene catalysed polyethylene.

Thus, as explained here above, recent developments have improved the marketability of metallocene-catalysed polymers. However, in such polymers, the catalytic residue is still high, particularly in high density polyethylene prepared with metallocene catalysts. The catalytic residue needs to be reduced in other to make the polyethylene suitable for membranes, medical appliances, food packaging etc. Thus, a high density polyethylene is needed with a reduced catalytic residue.

It is a further objective of the invention to provide a polyethylene with less volatiles and good organoleptic properties.

SUMMARY OF THE INVENTION

At least one of the objects is solved by the present invention.

The invention covers a polyethylene prepared with a metallocene catalyst system having
  a. a density of 0.945 $g/cm^3$ to 0.970 $g/cm^3$ measured according to ISO 1183 and
  b. a Si content of 5 to 40 ppm by weight.

The Si content is measured by x-ray fluorescence (XRF).

The polyethylene preferably has a density of at least 0.950 $g/cm^3$, more preferably at least 0.955 $g/cm^3$.

The polyethylene preferably has an Si content ranging from 5 to 30 ppm by weight, more preferably from 5 to 25 ppm by weight.

The polyethylene preferably has a melt flow index ($MI_2$) measured according to ISO 1133, condition D, at 190° C. and 2.16 kg from 0.01 to 50 g/10 min, more preferably from from 0.05 to 25 g/10 min, from 0.1 to 10 g/10 min.

The polyethylene preferably has a Cl content of less than 1 ppm by weight, more preferably less than 0.5 ppm by weight. The Cl content is measured by x-ray fluorescence (XRF).

Preferably, the polyethylene comprises titanium, more preferably from 0.1 to 10 ppm of Ti as measured by inductively coupled plasma atomic emission spectroscopy (ICP-AES).

The polyethylene preferably has
an atomic molar ratio of Ti/M of from 0.13 to 500, wherein M is a transition metal selected from one or more of zirconium, hafnium and vanadium, The Ti and M content is measured by ICP-AES.

DETAILED DESCRIPTION OF THE INVENTION

The polyolefin according to the invention is prepared with a "metallocene catalyst system". By "metallocene catalyst system" it is meant a catalyst system having as the catalyst one or more metallocene catalysts. Ziegler-Natta or Chromium-based (Phillips) catalysts are not present in the metallocene catalyst system. By "metallocene catalyst system" it is also meant that the one or more metallocene catalysts are supported on silica-containing support.

By the term polyethylene, it is meant both homopolymers and copolymers of ethylene. The ethylene is optionally copolymerised with one or more alpha-olefin comonomers, having from 1 to 12 carbon atoms.

According to a preferred embodiment the polyethylene according to the invention is prepared with a metallocene catalyst system comprising titanium, which increases the catalytic activity.

According to a specific embodiment, the polyethylene according to the invention can be prepared using a metallocene catalyst system prepared according to the following steps, preferably in the order given:
  a. titanating a silica-containing catalyst support having a specific surface area of from 150 $m^2/g$ to 800 $m^2/g$, preferably 280 to 600 $m^2/g$, more preferably 280 $m^2/g$ to 400 $m^2/g$, preferably in an atmosphere of dry and inert gas and/or air, preferably at at least 220° C., with at least one vapourised titanium compound of the general formula selected from $R_n Ti(OR')_m$ and $(RO)_n Ti(OR')_m$, wherein R and R' are the same or different and are selected from hydrocarbyl groups containing from 1 to 12 carbon and halogens, and wherein n is 0 to 4, m is 0 to 4 and m+n equals 4, to form a titanated silica-containing catalyst support having at least 0.1 wt % of Ti based on the weight of the titanated silica-containing catalyst support
  b. treating the titanated support with a catalyst activating agent, preferably an alumoxane.
  c. treating the titanated support with a metallocene during or after step (b).

Thus, titanation can occur using vaporised titanium compound. For more detail on how to carry out titanation by vapourised titanium compound, copending PCT/EP2011/053233 is included herein in its entirety.

According to another specific embodiment, the polyethylene according to the invention can be prepared using a metallocene catalyst system prepared according to a process having the following step:
  i) impregnating a silica-containing catalyst support having a specific surface area of from 150 $m^2/g$ to 800 $m^2/g$, preferably 280 $m^2/g$ to 600 $m^2/g$, with one or more titanium compounds of the general formula selected from $R_n Ti(OR')_m$ and $(RO)_n Ti(OR')_m$, wherein R and R' are the same or different and are selected from hydrocarbyl groups containing from 1 to 12 carbon and halogens, and wherein n is 0 to 4, m is 0 to 4 and m+n equals 4, to form a titanated silica-containing catalyst support having a Ti content of at least 0.1 wt % based on the weight of the Ti-impregnated catalyst support wherein the metallocene catalyst system further comprises an alumoxane and a metallocene.

Thus, titanation can occur by impregnating the silica-containing support with a titanium compound. For more detail on how to carry out titanation by impregnation, copending PCT/EP2011/061146 is included herein in its entirety.

According to another specific embodiment, the polyethylene according to the invention can be prepared using a metallocene catalyst system comprising a coprecipitated silica- and titania-containing support comprising an alumoxane and at least one metallocene, wherein the supported catalyst system has a Ti content of from 0.1 wt % to 12 wt %. Thus, titanium is present by corpecipitating silica and titania to form a cogel support. For more detail on how to carry out coprecipitation, copending PCT/EP2011/064093 is included herein in its entirety.

It should be noted that the supported catalyst system obtained according to this method has titanium deposited in or on the silica-containing support depending on the method used. Furthermore, it was observed that the catalyst support particles have a surprisingly improved morphology, particularly when comprising from 0.1 to 12 wt % of Ti based on the weight of the titanated silica-containing catalyst support. In specific embodiment a metallocene catalyst system is provided having a Ti content of 0.1 to 12 wt % based on the weight of the titanated silica-containing catalyst support, an atomic molar ratio of Ti to the transition metal M, selected from zirconium, hafnium and vanadium, (Ti/M) of 0.13 to 500 and preferably an atomic molar ratio of Cl to Ti (Cl/TO of less than 2.5. In a more preferred embodiment the supported metallocene catalyst system has a Ti content of 0.1 to 10 wt % based on the weight of the titanated silica-containing catalyst support, an atomic molar ratio Ti/M of 1.3 to 420 and preferably an atomic molar ratio Cl/Ti of less than 2.5. Thus accordingly, the polyethylene in this case also has preferably an atomic molar ratio of Ti/M, wherein M is selected from zirconium, hafnium and vanadium, of 0.13 to 500, preferably 1.3 to 420, and preferably an atomic molar ratio of Cl/Ti of less than 2.5.

Catalyst System

Suitable supports used in this invention are silica-containing supports. The support can have a surface area of at least 150 $m^2/g$, preferably of at least 200 $m^2/g$, more preferably of at least 280 $m^2/g$, and at most 800 $m^2/g$, preferably to at most 600 $m^2/g$, more preferably to at most 400 $m^2/g$ and more preferably to at most 380 $m^2/g$. The specific surface area is measured by $N_2$ adsorption using the well-known BET technique.

Silica-containing supports contain at least 20, 40, or 50% by weight of amorphous silica. The silica-containing support may also contain one or more of alumina, magnesia, titania, zirconia and the like.

Preferably the support is a silica support i.e. essentially 100% by weight of silica.

In another embodiment, the support is a silica-alumina support, in which case the support preferably comprises at most 15% by weight of alumina.

In general, the supports advantageously have a pore volume of 1 cm$^3$/g to 3 cm$^3$/g. Supports with a pore volume of 1.3-2.0 cm$^3$/g are preferred. Pore volume is measured by N$_2$ desorption using the BJH method for pores with a diameter of less than 1000 Å. Supports with too small a porosity may result in a loss of melt index potential and in lower activity. Supports with a pore volume of over 2.5 cm$^3$/g are less desirable because they may require special expensive preparation steps (e.g. azeotropic drying) during their synthesis. In addition, because they are usually more sensitive to attrition during catalyst handling, activation or use in polymerisation, these supports often lead to more polymer fines production, which is detrimental in an industrial process.

The silica-containing support can be prepared by various known techniques such as but not limited to gelification, precipitation and/or spray-drying. Usually, the particle size D50 is from 5 μm, preferably from 30 μm and more preferably from 35 μm, up to 150 μm, preferably up to 100 μm and most preferably up to 70 μm. D50 is defined as the particle diameter, where 50 wt-% of particles have a smaller diameter and 50 wt-% of particles have a larger diameter. Particle size D90 is up to 200 μm, preferably up to 150 μm, most preferably up to 110 μm. D90 is defined as the particle diameter where 90 wt-% of particles have a smaller diameter and 10 wt-% of particles have a larger diameter. Particle size D10 is at least 2 μm, preferably at least 5 μm. D10 is defined as the particle diameter where 10 wt-% of particles have a smaller diameter and 90 wt-% of particles have a larger diameter. Particle size distribution is determined using light diffraction granulometry, for example, using the Malvern Mastersizer 2000. The particle morphology is preferably microspheroidal to favour fluidisation and to reduce attrition.

The catalyst support is treated with a catalyst activating agent according to methods known in the art. In a preferred embodiment, alumoxane or a mixture of alumoxanes are used as an activating agent for the metallocene, but any other activating agent known in the art can be used e.g. borane compounds. The alumoxane can be used in conjunction with the metallocene in order to improve the activity of the catalyst system during the polymerisation reaction. As used herein, the term alumoxane is used interchangeably with aluminoxane and refers to a substance, which is capable of activating the metallocene.

Alumoxanes used in accordance with the present invention comprise oligomeric linear and/or cyclic alkyl alumoxanes. In an embodiment, the invention provides a process wherein said alumoxane has formula (III) or (IV)

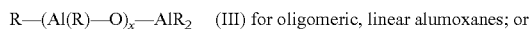  (III) for oligomeric, linear alumoxanes; or

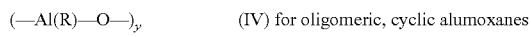  (IV) for oligomeric, cyclic alumoxanes wherein x is 1-40, and preferably 10-20;
wherein y is 3-40, and preferably 3-20; and
wherein each R is independently selected from a C$_1$-C$_8$ alkyl, and preferably is methyl.

In a preferred embodiment, the alumoxane is methylalumoxane (MAO). Generally, in the preparation of alumoxanes from, for example, aluminum trimethyl and water, a mixture of linear and cyclic compounds is obtained. Methods for manufacturing alumoxane are known in the art and will therefore not be disclosed in detail herein.

The treatment of the catalyst support with the alumoxane can be carried out according to any known method known by the person skilled in the art. Advantageously, the alumoxane, preferably MAO, is mixed in an inert diluent/solvent, preferably toluene, with the catalyst support. Alumoxane deposition preferably occurs at a temperature between 60° C. to 120° C., more preferably 80° C. to 120° C., most preferably 100 to 120° C.

The catalyst support is treated with a metallocene either during treatment with the catalyst activating agent (1-pot method) or thereafter. Any metallocene known in the art can be applied, including a mixture of different metallocenes. As used herein, the term "metallocene" refers to a transition metal complex with a coordinated structure, consisting of a metal atom bonded to one or more ligands. The metallocene are used according to the invention is preferably chosen from formula (I) or (II):

  (I); or

  (II)

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of hydrogen, halogen and a hydrocarbyl having 1 to 20 carbon atoms and wherein said hydrocarbyl optionally contains one or more atoms selected from the group comprising B, Si, S, O, F and P;

wherein M is a transition metal M selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F and P; and wherein R" is a divalent group or moiety bridging the two Ar groups and selected from the group consisting of a C$_1$-C$_{20}$ alkylene, a germanium, a silicon, a siloxane, an alkylphosphine and an amine, and wherein said R" is optionally substituted with one or more substituents each independently selected from the group comprising a hydrocarbyl having 1 to 20 carbon atoms and wherein said hydrocarbyl optionally contains one or more atoms selected from the group comprising B, Si, S, O, F and P.

The term "hydrocarbyl having 1 to 20 carbon atoms" as used herein is intended to refer to a moiety selected from the group comprising a linear or branched C$_1$-C$_{20}$ alkyl; C$_3$-C$_{20}$ cycloalkyl; C$_6$-C$_{20}$ aryl; C$_7$-C$_{20}$ alkylaryl and C$_7$-C$_{20}$ arylalkyl, or any combinations thereof.

Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

Exemplary halogen atoms include chlorine, bromine, fluorine and iodine and of these halogen atoms, chlorine is preferred.

Exemplary hydrocarboxy groups are methoxy, ethoxy, propoxy, butoxy, and amyloxy.

In accordance with the present invention, a process is provided wherein ethylene monomer is polymerised in the presence of a bridged or non-bridged metallocene. "Bridged metallocenes" as used herein, are metallocenes in which the two aromatic transition metal ligands, denoted as Ar in formula (I) and (II) are covalently linked or connected by means of a structural bridge. Such a structural bridge, denoted as R" in formula (I) and (II) imparts stereorigidity on the metallocene, i.e. the free movement of the metal ligands is restricted. According to the invention, the bridged metallocene consists of a meso or racemic stereoisomer.

The two Ar can be the same or different. In a preferred embodiment the two Ar are both indenyl or both tetrahydroindenyl wherein each of said groups may be optionally substituted with one or more substituents each independently selected from the group consisting of hydrogen, halogen and a hydrocarbyl having 1 to 20 carbon atoms and wherein said hydrocarbyl optionally contains one or more atoms selected from the group comprising B, Si, S, O, F and P. If substituted, both Ar are preferably identically substituted. However, in a preferred embodiment, both Ar are unsubstituted.

In a preferred embodiment, the metallocene used in a process according to the invention is represented by formula (I) or (II) as given above,
  wherein Ar is as defined above, and wherein both Ar are the same and are selected from the group consisting of cyclopentadienyl, indenyl, tetrahydroindenyl and fluorenyl, wherein each of said groups may be optionally substituted with one or more substituents each independently selected from the group consisting of halogen and a hydrocarbyl having 1 to 20 carbon atoms as defined herein;
  wherein M is as defined above, and preferably is zirconium,
  wherein Q is as defined above, and preferably both Q are the same and are selected from the group consisting of chloride, fluoride and methyl, and preferably are chloride; and
  and wherein R" when present, is as defined above and preferably is selected from the group consisting of a $C_1$-$C_{20}$ alkylene, and a silicon, and wherein said R" is optionally substituted with one or more substituents each independently selected from the group comprising a halogen, hydrosilyl, hydrocarbyl having 1 to 20 carbon atoms as defined herein.

In another preferred embodiment, the metallocene used in a process according to the invention is represented by formula (I) or (II) as given above,
  wherein Ar is as defined above, and wherein both Ar are different and are selected from the group consisting of cyclopentadienyl, indenyl, tetrahydroindenyl and fluorenyl, wherein each of said groups may be optionally substituted with one or more substituents each independently selected from the group consisting of, halogen and a hydrocarbyl having 1 to 20 carbon atoms as defined herein;
  wherein M is as defined above, and preferably is zirconium, wherein Q is as defined above, and preferably both Q are the same and are selected from the group consisting of chloride, fluoride and methyl, and preferably are chloride; and
  and wherein R" when present is as defined above and preferably is selected from the group consisting of a $C_1$-$C_{20}$ alkylene, and a silicon, and wherein said R" is optionally substituted with one or more substituents each independently selected from the group comprising a hydrocarbyl having 1 to 20 carbon atoms as defined herein.

In an embodiment, the invention provides a process wherein said metallocene is an unbridged metallocene.

In a preferred embodiment, the invention provides a process wherein said metallocene is an unbridged metallocene selected from the group comprising bis(iso-butylcyclopentadienyl)zirconium dichloride, bis(pentamethylcyclopentadienyl)zirconium dichloride, bis(tetrahydroindenyl)zirconium dichloride, bis(indenyl)zirconium dichloride, bis(1,3-dimethylcyclopentadienyl)zirconium dichloride, bis(methylcyclopentadienyl)zirconium dichloride, bis(n-butylcyclopentadienyl)zirconium dichloride, and bis(cyclopentadienyl)zirconium dichloride; and preferably selected from the group comprising bis(cyclopentadienyl)zirconium dichloride, bis(tetrahydroindenyl)zirconium dichloride, bis(indenyl)zirconium dichloride, and bis(1-methyl-3-butyl-cyclopentadienyl)zirconium dichloride.

In another embodiment, the invention provides a process wherein said metallocene is a bridged metallocene.

In a preferred embodiment, the invention provides a process wherein said metallocene is a bridged metallocene selected from the group comprising ethylene bis(4,5,6,7-tetrahydro-1-indenyl)zirconium dichloride, ethylene bis(1-indenyl)zirconium dichloride, dimethylsilylene bis(2-methyl-4-phenyl-inden-1-yl)zirconium dichloride, dimethylsilylene bis(2-methyl-1H-cyclopenta[a]naphthalen-3-yl)zirconium dichloride, cyclohexylmethylsilylene bis[4-(4-tert-butylphenyl)-2-methyl-inden-1-yl]zirconium dichloride, dimethylsilylene bis[4-(4-tert-butylphenyl)-2-(cyclohexylmethyl)inden-1-yl]zirconium dichloride. Ethylene bis(4,5,6,7-tetrahydro-1-indenyl)zirconium dichloride is particularly preferred.

In another preferred embodiment, the invention provides a process wherein said metallocene is a bridged metallocene selected from the group comprising diphenylmethylene(3-t-butyl-5-methyl-cyclopentadienyl)(4,6-di-t-butyl-fluorenyl) zirconium dichloride, di-p-chlorophenylmethylene(3-t-butyl-5-methyl-cyclopentadienyl)(4,6-di-t-butyl-fluorenyl) zirconium dichloride, diphenylmethylene(cyclopentadienyl)(fluoren-9-yl)zirconium dichloride, dimethylmethylene(cyclopentadienyl)(2,7-ditert-butyl-fluoren-9-yl)zirconium dichloride, dimethylmethylene[1-(4-tert-butyl-2-methyl-cyclopentadienyl)](fluoren-9-yl)zirconium dichloride, diphenylmethylene[1-(4-tert-butyl-2-methyl-cyclopentadienyl)](2,7-ditert-butyl-fluoren-9-yl)zirconium dichloride, dimethylmethylene[1-(4-tert-butyl-2-methyl-cyclopentadienyl)](3,6-ditert-butyl-fluoren-9-yl)zirconium dichloride dimethylmethylene(cyclopentadienyl)(fluoren-9-yl)zirconium dichloride and dibenzylmethylene(2,7-diphenyl-3,6-di-tert-butyl-fluoren-9-yl)(cyclopentadienyl)zirconium dichloride.

The support is treated with the metallocene, advantageously by mixing the desired metallocene(s) with the MAO-modified support. Preferably mixing occurs at room temperature for a duration of at least 15 min, preferably at least 1 hour, more preferably at least 2 hours.

In a particular embodiment, the invention provides a process wherein the molar ratio of aluminum, provided by the alumoxane, to transition metal M, provided by the metallocene, of the polymerisation catalyst is between 20 and 200, and for instance between 30 and 150, or preferably between 30 and 100.

When the metallocene catalyst system has from 0.1 to 12 wt % of Ti based on the weight of the titanated silica-containing catalyst support, the atomic molar ratio of Ti to the transition metal M (Ti/M), wherein M is a transition metal selected from zirconium, hafnium and vanadium, of the supported catalyst system is of 0.13 to 500 and the atomic molar Cl/Ti ratio is preferably less than 2.5. When the catalyst system of the invention has a preferred Ti content of 1 to 10 wt % based on the weight of the titanated silica-containing catalyst support, the Ti/M atomic molar ratio of the supported catalyst system is of 1.3 to 420. The content of Cl, Ti and M are measured by X-ray fluorescence (XRF) as is known in the art.

Polymerisation

The ethylene polymerisation (which includes homo- and copolymerisations) process is preferably carried out in the liquid phase (i.e. known as "slurry phase" or "slurry process") or in the gas phase i.e. heterogeneous processes.

Liquid Phase

In a slurry process (liquid phase), the liquid comprises ethylene, and optionally one or more alpha-olefinic comonomers comprising from 2 to 12 carbon atoms, preferably in an inert diluent or in a diluent of active monomer or comonomer. The comonomer may be selected from one or more alpha-olefins, such as propylene, 1-butene, 1-hexene, 4-methyl-1-pentene, 1-heptene and 1-octene. The inert diluent can be isobutane, propane, hexane etc. Comonomer is added such that the final density of the polyethylene is at least 0.945 g/cc, preferably at least 0.950 g/cc, more preferably at least 0.955 g/cc, measured according to ISO 1183. The polyethylene preferably has a density not higher than 0.970 g/cc.

The polymerisation process for ethylene is typically carried out at a polymerisation temperature of from 80 to 110° C. and under a pressure of at least 20 bars. Preferably, the temperature ranges from 85 to 110° C. and the pressure is at least 40 bars, more preferably from 40 to 42 bars.

Other compounds such as a metal alkyl or hydrogen may be introduced into the polymerisation reaction to regulate activity and polymer properties such as melt flow index. In one preferred process of the present invention, the polymerisation or copolymerisation process is carried out in a slurry reactor, e.g. in a liquid-full loop reactor.

Gas Phase

The catalyst system of the invention is also particularly suited for gas phase polymerisations of ethylene. Gas phase polymerisations can be performed in one or more fluidised bed or agitated bed reactors. The gas phase comprises ethylene and optionally one or more alpha-olefinic comonomers comprising 2 to 12 carbon atoms, such as propylene, 1-butene, 1-hexene, 4-methyl-1-pentene, 1-octene or mixtures thereof and an inert gas, such as nitrogen. Optionally a metal alkyl can also be injected in the polymerisation medium as well as one or more other reaction-controlling agents, for example, hydrogen. Reactor temperature can be adjusted to a temperature of from 60, 65, 70, 80, 85, 90 or 95° C. up to 100, 110, 112 or 115° C. (Report 1: Technology and Economic Evaluation, Chem Systems, January 1998). Optionally a hydrocarbon diluent such as pentane, isopentane, hexane, isohexane, cyclohexane or mixtures thereof can be used if the gas phase unit is run in the so-called condensing or super-condensing mode.

Polyethylene

The high density polyethylene according to the invention is prepared by increasing the catalytic activity of the metallocene catalyst system.

The polyethylene has properties typical for polyethylene prepared with a metallocene catalyst system: namely a narrow molecular weight distribution (MWD) of 2 to 10, regular and uniform comonomer insertion and narrow comonomer distribution i.e. the comonomer is distributed evenly on all polymer chains, both of lower and higher molecular weights. The comonomer distribution breadth index (CDBI) is preferably at least 50%, more preferably at least 60%, even more preferably at least 70%, most preferably at least 80%, measurable by temperature rising elution fractionation (TREF) as described in Wild et al, Journal of Polymer Science, Pol. Phys. Ed. Vol 20, p 441 (1982) or in U.S. Pat. No. 4,798,081.

The invention thus covers polyethylene having a high density, above 0.945 g/cc measured according to ISO 1183, preferably at least 0.950 g/cc, preferably at least 0.955 g/cc, more preferably at least 0.960 g/cc.

The Si content is particularly low. The atomic Si content of the polyethylene is thus only 5 to 40 ppm by weight, preferably only 5 to 35 ppm, more preferably 5 to 30 ppm. Si content is measured by x-ray fluorenscence (XRF) according to following procedure:

1. Preparing the 1 mm Thick Sample Discs of Polyethylene for Measuring Si Content by XRF:

15 g of the polyethylene are placed between 2 sheets of Melimex 401 of 125μ, which is then placed between two metallic plates and pressed together under heating to 200° C. An increasing pressure up to 4 bar is then exerted for 2 minutes in the Carver 2518® press. The sample is cooled until hardened, upon which the Melimex sheets are removed. The sample is rolled on itself. The rolled sample is again placed between the Melimex sheets and heated and pressed as before. The sample is then re-rolled on itself again and the heating and pressure applied once more, except that a mould of about 1 mm is included in the inside support of the metallic plate. An increasing pressure up to 4 bar is applied for 10 minutes. The sample is cooled, released from the mould and then punched to obtain 3 discs of 50 mm in diameter and 1 mm in thickness.

2. Measuring the Si Content

XRF is measured on a Philips PW 2400 equipped with an RX tube and a chrome anode the PANanalytical softwares "SuperQ—software for xray analyzers" version 3.0 and "X40".

A standard reference is used in this method in the form of Si-doped pearls (prepared from aqueous solution of 1000 ppm by weight Si) to cover the equivalent range of Si-content of the polyethylene sample to be measured anywhere from 0 to 1050 ppm. The amount of Si on these pearls are determined by their fluorescence intensity using application 22 of the "X40" software.

The sample holders with the sample polyethylene are held under vacuum. The internal surface of the sample holder is bare; No retention film is used. Using the "SuperQ" software, each Si measurement is made twice and on both surfaces of the sample disc. Thus, 4 measurements are made on each sample disc. Results are expressed in ppm.

The polyethylene can have a molecular weight distribution (MWD) that is represented by Mw/Mn (weight average molecular weight/number average molecular weight, measured by GPC analysis) of typically from 2 to 10, more typically of 3 to 8. The molecular weights are determined by Size Exclusion Chromatography (SEC) at high temperature (145° C.). A 10 mg polyethylene sample is dissolved at 160° C. in 10 ml of trichlorobenzene (technical grade) for 1 hour. Analytical conditions for the GPCV 2000 from WATERS are:

Injection volume: +/−400 μl
   Automatic sample preparation and injector temperature: 160° C.
   Column temperature: 145° C.
   Detector temperature: 160° C.

Column set: 2 Shodex AT-806MS and 1 Styragel HT6E

Flow rate: 1 ml/min

Detector: Infrared detector (2800-3000 cm-1)

Calibration: Narrow standards of polystyrene (commercially available)

Calculation for polyethylene: Based on Mark-Houwink relation (log 10(MPE)=0.965909 log 10(MPS)−0.28264); cut off on the low molecular weight end at MPE=1000.

The molecular weight distribution (MWD) is then calculated as Mw/Mn.

The melt flow index ($MI_2$) of the polyethylene measured according to ISO 1133, condition D, at 190° C. and 2.16 kg is preferably from 0.01, 0.05, 0.1, 0.5 up to 5, 10, 15, 20, 25 or 50 g/10 min.

When the metallocene catalyst system to prepare the polyethylene has a Ti content of 1 to 12 wt % based on the weight of the titanated silica-containing catalyst support, the polyethylene obtained therewith has an atomic molar ratio of Ti to the transition metal M i.e. Ti/M, wherein M is selected from one or more of zirconium, hafnium and vanadium, of 0.13 to 500. The zirconium, hafnium or vanadium is the coordinating metal of the metallocene.

When the metallocene catalyst system of the invention has a Ti content of 1 to 10 wt % based on the weight of the titanated silica-containing catalyst support, the polyethylene obtained therewith preferably has a Ti/M atomic molar ratio of 1.3 to 420.

The transition metal M indicates that the polyethylene was obtained in the presence of at least one metallocene. The presence of Ti indicates the use a Ti containing compound preferably used to boost catalytic activity of the metallocene.

The content of Ti and M (transition metal from the metallocene) of the polyolefin are measured by inductively coupled plasma atomic emission spectroscopy (ICP-AES) (e.g. on a Perkin-Elmer 3000DV or 7300DV or Job-Yvon) as is known in the art, in particular, according to the following procedure can be used:

1. Calcinate 10.000 g+/−0.1 mg of the polyethylene sample e.g. in a CEM Airwave 7000, 600° C., minimum 30 min. If a deposit persists, treat with concentrated HF overnight.
2. Cool the sample, dissolve in 1 ml concentrated HCl and Milli-Q® deionised water while agitating the mixture under heat to achieve full dissolution.
3. Cool the sample and transfer to a sample gauge of 50 ml in size and bring to 50 ml using Milli-Q® deionised water.
4. Commercial standard reference solutions can be used (from Merck, Spex . . . ) depending on the element to be measured by ICP-AES.
5. The amount of each element is calculated as follows (Reading (mg/l of the element in solution)×Volume (50 ml)×dilution coefficient)/mass(g)=amount in ppm.

In addition, the Cl content of the polyethylene is preferably less than 1 ppm by weight, preferably less than 0.5 ppm, more preferably less than 0.1 ppm, preferably below the detection limit of x-ray fluorescence (XRF) by which atomic Cl content is measured. This indicates that the polyolefin was obtained in the absence of a Ziegler-Natta catalyst, since Ziegler-Natta catalysts include large amounts of Cl.

Cl content is measured by x-ray fluorenscence (XRF) according to following procedure:

1. Preparing the 1 mm Thick Sample Discs of Polyethylene for Measuring Si Content by XRF:
   15 g of the polyethylene are placed between 2 sheets of Melimex 401 of 125μ, which is then placed between two metallic plates and pressed together under heating to 200° C. An increasing pressure up to 4 bar is then exerted for 2 minutes in the Carver 2518® press. The sample is cooled until hardened, upon which the Melimex sheets are removed. The sample is rolled on itself. The rolled sample is again placed between the Melimex sheets and heated and pressed as before. The sample is then re-rolled on itself again and the heating and pressure applied once more, except that a mould of about 1 mm is included in the inside support of the metallic plate. An increasing pressure up to 4 bar is applied for 10 minutes. The sample is cooled, released from the mould and then punched to obtain 2 discs of 30 mm in diameter and 1 mm in thickness.
2. Measuring the Cl Content
   XRF is measured on a Philips PW 2400 equipped with an RX tube and a chrome anode the PANanalytical software "X40". The sample holders are held under helium atmosphere. The internal surface of the sample holder is covered with a Mylar® retention film. Using the "X40" software, each measurement is made twice and on both surfaces of the sample disc. Thus, 4 measurements are made on each sample disc. Results are expressed in ppm.

Note that the measurements of ICP-AES and XRF are made on the polyethylene obtained from the reactor (the fluff), prior to additivation, extrusion and pelletizing.

Due to the increased activity of the metallocene catalyst system, far less catalyst needs to be used. As a result, the polyethylene has a lower catalytic residue, which in turn improves its use in terms of health and safety (less catalytic residue which may potentially migrate to the surface). Due to the increased activity, the polyethylene also has a lower amount of volatiles, because monomer and optional comonomer are more efficiently incorporated.

Thus, the polyethylene obtained using the supported catalyst system of the invention is particular suitable for applications requiring good organoleptic properties e.g. for food and drink packaging.

The following Examples are given to illustrate the invention without limiting its scope.

EXAMPLES

Metallocene Catalyst System "Catalyst Z1"

Silica support (having 100 wt % silica and a specific surface area of about 300 m2/g, a pore volume of 1.6 mL/g and a d50 of 41 μm) was heated under a nitrogen flow with the desired amount of Ti precursor i.e. TYSOR® a mixture of 80 wt % isopropoxide titane and 20 wt % tertiary butoxide titane at 270° C. (in vapour form), then dried at 450° C. to provide titanated catalyst supports of 2 wt % (catalyst Z1). MAO was mixed in toluene with the support at 110° C. After filtration, the recovered powder was washed and dried overnight to obtain the MAO-and Ti-modified support. The metallocene ethylene-bis(4,5,6,7-tetrahydro-1-indenyl)zirconium dichloride was stirred with the MAO-and Ti-modified support at room temperature for 2 hours. After filtration, the recovered powder was washed and dried overnight to obtain the supported catalyst system according to the invention.

The obtained metallocene catalyst system "Catalyst Z1" had a Ti content of 1.5 wt % Ti and a Ti/Zr atomic molar ratio of 3.07. The content of Cl was below the detection limit of XRF, only trace amounts present.

Metallocene Catalyst System "Catalyst Z2"

In a 250 mL round bottom flask conditioned under a light nitrogen flow, 25 g of silica (same as for catalyst Z1) was stirred at 60 rpm and dried at 110° C. overnight. 190 mL of dry hexane was then added. The suspension was cooled at 0° C. and 3.2 mL of VertecBip® (20:80 weight ratio of Ti(OC$_4$H$_9$)$_4$ to Ti(OC$_3$H$_7$)$_4$) was added dropwise to impregnate the support. The suspension was mixed for 20 hours at 0° C. The solvent was removed under reduced pressure and the resulting silica was dried under a nitrogen flow at 450° C. for 4 hours. The Ti-impregnated silica had a Ti content of 2 wt %. 20 g of this dried Ti-impregnated silica was introduced in a 500 mL round-bottomed flask. Toluene was added and the suspension was stirred at 100 rpm. MAO (30 wt. % in toluene) was dropwise added via a dropping funnel and the resulting suspension was heated at 110° C. (reflux) for 4 hours. The amount of added MAO was calculated to reach the desired Al loading. After the reflux, the suspension was cooled down to room temperature and the mixture was filtered through a glass frit. The recovered powder of SMAO was washed with toluene and pentane before being dried under reduced pressure overnight. In 250 ml round bottom flask, 9.8 g of the obtained SMAO silica was suspended in 80 ml toluene. Then, 0.2 g of ethylene-bis(4,5,6,7-tetrahydro-1-indenyl)zirconium dichloride in a suspension of 20 ml of toluene was added to the suspended silica-containing support. The resulting suspension was stirred at 100 rpm for 2 hours at room temperature. Finally, the obtained catalyst was filtered, washed with toluene and pentane before being dried overnight. The obtained metallocene catalyst system "Catalyst Z2" had a Ti content of 1.5 wt % Ti and a Ti/Zr atomic molar ratio of 3.07. The content of Cl was below the detection limit of XRF, only trace amounts were present.

Comparative Metallocene Catalyst System "Catalyst C"

Silica support (having 100 wt % silica and a specific surface area of about 300 m2/g) was dried under a nitrogen flow at 450° C. MAO was mixed in toluene with the modified support at 110° C. After filtration, the recovered powder was washed and dried overnight to obtain the MAO-modified support. The metallocene ethylene-bis(4,5,6,7-tetrahydro-1-indenyl)zirconium dichloride was stirred with the MAO-modified support at room temperature for 2 hours. After filtration, the recovered powder was washed and dried overnight to obtain the metallocene catalyst system "Catalyst C". The content of Cl was below the detection limit of XRF, only trace amounts present.

Content of Various Elements in the Catalysts:

|  |  | Catalyst type | | |
|---|---|---|---|---|
|  |  | Catalyst Z1 | Catalyst Z2 | Catalyst C |
| Al | (wt %) | 14.0 | 14.8 | 14.8 |
| Zr | (wt %) | 0.36 | 0.38 | 0.37 |
| Si | (wt %) | 31.10 | 30.53 | 30.88 |
| Ti | (wt %) | 1.5 | 1.5 | 0 |

Ethylene Polymerisations

Polymerisation of ethylene was carried out with "Catalyst Z1" and "Catalyst Z2" and compared with a polymerisation of ethylene using "Catalyst C" under the same reaction conditions.

|  |  |  | Catalyst type | | |
|---|---|---|---|---|---|
|  |  |  | Catalyst Z1 | Catalyst Z2 | Catalyst C |
| 1$^{st}$ loop reactor OPERATING CONDITIONS | TEMP. | (° C.) | 91 | 91 | 91 |
|  | ALKYL | (type) | TibAl | TibAl | TibAl |
|  | ALKYL | (wt %) | 10 | 10 | 10 |
|  | Ethylene C2- | (kg/h) | 35.0 | 35.0 | 35.0 |
|  | Hexene C6- | (kg/h) | 0.15 | 0.08 | 0.07 |
|  | H$_2$ | (Nl/h) | 18.5 | 21.0 | 21.0 |
|  | Isobutane IC4 | (kg/h) | 60 | 60 | 60 |
| CONTRIBUTION SOLIDS | In 1$^{st}$ loop reactor | (wt %) | 62.5 | 60.8 | 60.4 |
|  |  | (wt %) | 34.4 | 33.9 | 34.0 |
| RESIDENCE TIME |  | (min) | 57.0 | 57.5 | 57.4 |
| 1$^{st}$ loop reactor ANALYTICAL RESULTS | MI2 | (g/10') | 1 | 1 | 1 |
|  | MI5 | (g/10') | 3.30 | 4 | 4 |
|  | HLMI | (g/10') | 31 | 33 | 37 |
|  | SR2 |  | 31 | 33 | 33 |
|  | DENSITY | (g/cm$^3$) | 0.9543 | 0.9532 | 0.9543 |
|  | BULK DENSITY | (g/cm$^3$) | 0.37 | 0.38 | 0.38 |
| 2$^{nd}$ loop reactor OPERATING CONDITIONS | TEMP. | (° C.) | 95 | 95 | 95 |
|  | ALKYL | (type) | TibAl | TibAl | TibAl |
|  | ALKYL | (wt %) | 10 | 10 | 10 |
|  | C2- | (kg/h) | 22 | 22 | 22 |
|  | C6- | (Kg/h) | 0 | 0 | 0 |
|  | H2 | (Nl/h) | 15.20 | 12.50 | 12.70 |
|  | IC4 | (kg/h) | 45 | 45 | 45 |

-continued

| | | | | | |
|---|---|---|---|---|---|
| SOLIDS RESIDENCE TIME PRODUCTIVITY | In 2$^{nd}$ loop reactor | (wt %) (min) (gPE/gcata) | 32.4 33.6 3411 | 32.5 33.6 3759 | 32.8 33 1718.47 |
| TOTAL ACTIVITY (ICP) | | (gPE/gcata/h) | 9688 | 8529 | 4541 |
| 2$^{nd}$ loop reactor ANALYTICAL RESULTS | MI2 MI5 HLMI SR2 DENSITY BULK DENSITY | (g/10') (g/10') (g/10') (g/cm$^3$) (g/cm$^3$) | 1.10 3.60 33.0 30.0 0.9549 0.40 | 0.95 3.25 30.3 32.0 0.9539 0.39 | 1.00 3.30 31.6 32.0 0.9536 0.42 |

| | PE Sample prepared with Catalyst Z1 | PE Sample prepared with Catalyst Z2 | PE Sample prepared with Catalyst C |
|---|---|---|---|
| MI2 (g/10 min) | 1.10 | 0.95 | 1.00 |
| HLMI (g/10 min) | 33.0 | 30.3 | 31.6 |
| Density (g/m3) | 0.9549 | 0.9539 | 0.9536 |
| Bulk Density (g/cm3) | 0.40 | 0.39 | 0.42 |
| Si content (ppm by weight) of fluff (measured by XRF) | 32 | 36 | 68 |
| Ti content (ppm by weight) of fluff (measured by ICP-AES) | Not measured | 0.95 ppm | 0 ppm |
| Productivity (g of PE/g of Catalyst) (ICP) | 9688 | 8529 | 4541 |

As presented, the polyethylene according to the invention has reduced catalytic residues. The content of Cl was below the detection limit as measured by XRF, only trace amounts were present. Si content was between 5 and 40 ppm by weight measured using XRF as well. However, the comparative polyethylene has a higher Si content, indicating a less active supported metallocene catalyst. Indeed, productivity was much lower.

The invention claimed is:

1. A polyethylene, prepared with a metallocene catalyst system, having:
   a density of 0.945 g/cm$^3$ to 0.970 g/cm$^3$ measured according to ISO 1183; and
   a Si content of 5 to 40 ppm by weight.

2. The polyethylene according to claim 1, wherein the polyethylene has a density of from 0.950 g/cm$^3$ to 0.970 g/cm$^3$ measured according to ISO 1183.

3. The polyethylene according to claim 1, wherein the polyethylene has a density of from 0.955 g/cm$^3$ to 0.970 g/cm$^3$ measured according to ISO 1183.

4. The polyethylene according to claim 1, wherein the Si content ranges from 5 to 30 ppm by weight.

5. The polyethylene according to claim 1, wherein the Si content ranges from 5 to 25 ppm by weight.

6. The polyethylene according to claim 1, wherein the polyethylene has a melt flow index (MI$_2$) measured according to ISO 1133, condition D, at 190° C. and 2.16 kg ranging from 0.01 to 50 g/10 min.

7. The polyethylene according to claim 6, wherein the polyethylene has a melt flow index (MI$_2$) ranging from 0.05 to 25 g/10 min.

8. The polyethylene according to claim 6, wherein the polyethylene has a melt flow index (MI$_2$) ranging from 0.1 to 10 g/10 min.

9. The polyethylene according to claim 1, wherein the polyethylene has a Cl content of less than 1 ppm by weight.

10. The polyethylene according to claim 1, wherein the polyethylene has a Cl content of less than 0.5 ppm by weight.

11. The polyethylene according to claim 1, wherein the polyethylene has a Ti content ranging from 0.1 to 10 ppm by weight.

12. The polyethylene according to claim 11, wherein the polyethylene has an atomic molar ratio of Ti/M of from 0.13 to 500, wherein M is one or more transition metals selected from one or more of zirconium, hafnium and vanadium.

* * * * *